(12) United States Patent
Das

(10) Patent No.: US 10,394,551 B2
(45) Date of Patent: *Aug. 27, 2019

(54) MANAGING KERNEL APPLICATION BINARY INTERFACE/APPLICATION PROGRAMMING INTERFACE-BASED DISCREPANCIES RELATING TO KERNEL PACKAGES

(75) Inventor: Kushal Das, West Bengal (IN)

(73) Assignee: Red Hat, Inc., Raleigh, NC (US)

( * ) Notice: Subject to any disclaimer, the term of this patent is extended or adjusted under 35 U.S.C. 154(b) by 703 days.

This patent is subject to a terminal disclaimer.

(21) Appl. No.: 13/034,568

(22) Filed: Feb. 24, 2011

(65) Prior Publication Data

US 2012/0221890 A1 Aug. 30, 2012

(51) Int. Cl.
G06F 9/44 (2018.01)
G06F 8/71 (2018.01)

(52) U.S. Cl.
CPC ...................... *G06F 8/71* (2013.01)

(58) Field of Classification Search
CPC ............................... G06F 11/0706; G06F 8/71
See application file for complete search history.

(56) References Cited

U.S. PATENT DOCUMENTS

| 5,974,470 | A | * | 10/1999 | Hammond | G06F 9/44521 |
| | | | | | 707/999.202 |
| 8,453,108 | B1 | * | 5/2013 | Govil | G06F 8/35 |
| | | | | | 717/104 |
| 2003/0145315 | A1 | * | 7/2003 | Aro | G06F 9/541 |
| | | | | | 717/170 |
| 2003/0229890 | A1 | * | 12/2003 | Lau | G06F 8/65 |
| | | | | | 717/168 |
| 2004/0225919 | A1 | * | 11/2004 | Reissman | G06F 11/3604 |
| | | | | | 714/38.12 |
| 2007/0168957 | A1 | * | 7/2007 | Li | G06F 11/3604 |
| | | | | | 717/120 |
| 2007/0220343 | A1 | * | 9/2007 | Harres | G06F 11/0751 |
| | | | | | 714/36 |
| 2009/0138843 | A1 | * | 5/2009 | Hinton | G06F 8/74 |
| | | | | | 717/101 |
| 2012/0066333 | A1 | * | 3/2012 | Browning | G06F 9/541 |
| | | | | | 709/212 |
| 2012/0143929 | A1 | | 6/2012 | Baratakke et al. | |
| 2012/0174124 | A1 | | 7/2012 | Ward et al. | |

* cited by examiner

Primary Examiner — Chat C Do
Assistant Examiner — Lening Paulino
(74) Attorney, Agent, or Firm — Lowenstein Sandler LLP

(57) ABSTRACT

A method for managing kernel interface-based discrepancies may include finding a software package having a first version of a kernel package, and retrieving a first kernel interface information from a first file within the kernel package. The first kernel interface information relates to kernel interfaces associated with the kernel package, wherein the interfaces include kernel application binary interface (kABI). The method may further include forming a first dataset including the first kernel interface information relating to the first version of the kernel package, and detecting kernel discrepancies by comparing the first dataset with a second dataset relating to a second version of the kernel package.

21 Claims, 4 Drawing Sheets

US 10,394,551 B2

MANAGING KERNEL APPLICATION BINARY INTERFACE/APPLICATION PROGRAMMING INTERFACE-BASED DISCREPANCIES RELATING TO KERNEL PACKAGES

TECHNICAL FILED

The embodiments of the invention relate generally to software compatibility and, more specifically, relate to providing a mechanism for managing kernel application binary interface/application programming-based discrepancies relating to kernel packages.

BACKGROUND

In computing systems, a kernel serves as a central component for facilitating communication between software applications and hardware devices (e.g., central processing unit (CPU), memory, input/output (I/O) devices, etc.) of a machine. For example, a kernel may be responsible for facilitating operating system functions and various management tasks (e.g., process management, disk management, memory management, etc.). Given the kernel's central position with regard to proper functioning of computing systems, a kernel package (containing the kernel and other essential kernel-related information) is expected to be developed free of errors and work seamlessly; however, developing a kernel package is regarded as one of the most complex and difficult tasks in computer programming.

One problem with the development of kernel packages is human errors. A kernel package developer (e.g., software developer, computer programmer, etc.) is often the primary source of unintended changes to the kernel that can lead to discrepancies and errors, and such errors, if left undetected, can cause a computing system to freeze. To determine whether a kernel package is free of errors, kernel developers perform a manual review to detect these errors so they can be corrected. Further, since these errors may not be known beforehand, a review process may be required to be performed multiple times to be successful; consequently, these manual kernel review processes are inefficient, cumbersome, convoluted, and prone to human errors.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
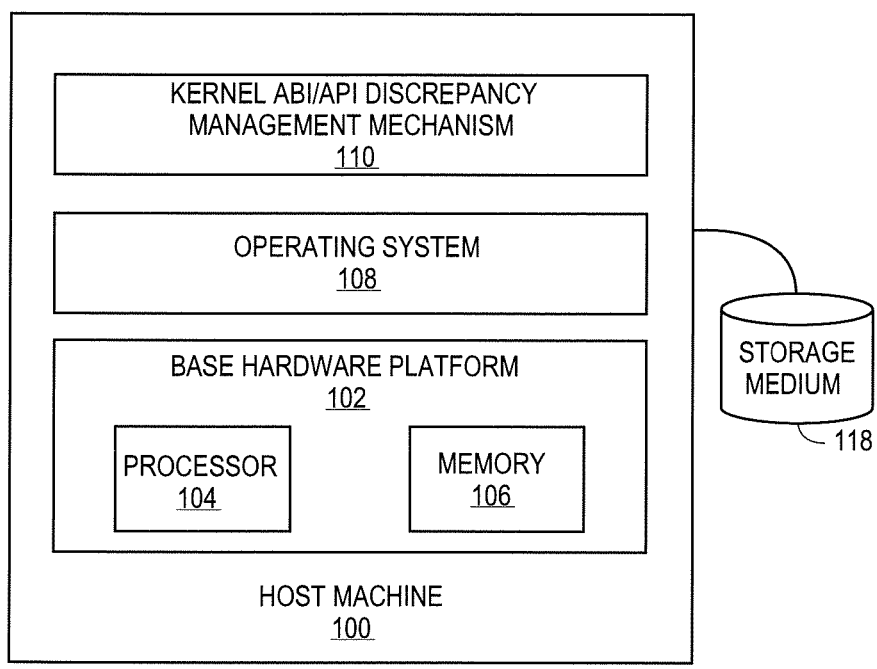
FIG. 1 illustrates a host machine employing a kernel application binary interface/application programming interface discrepancy management mechanism according to one embodiment of the invention.

Embodiments of the invention provide a mechanism for managing kernel interface-based discrepancies is described. A method of embodiments of the invention may include finding a software package having a first version of a kernel package, and retrieving a first kernel interface information from a first file within the kernel package. The first kernel interface information relates to kernel interfaces associated with the kernel package, wherein the interfaces include kernel application binary interface (kABI). The method may further include forming a first dataset including the first kernel interface information relating to the first version of the kernel package, and detecting kernel discrepancies by comparing the first dataset with a second dataset relating to a second version of the kernel package.

The embodiments of the present invention are provided for managing kernel application binary interface ("kernel ABI" or "kABI") and/or kernel application programming interface ("kernel API" or "kAPI") discrepancies relating to kernel packages. Embodiments of the invention are applicable to kernel ABIs and/or kernel APIs and as such, terms like "kABI(s)/kAPI(s)" and "kernel ABI/API(s)", used throughout this document, refer to "kernel ABI(s) and/or kernel API(s)". In one embodiment, kABIs/kAPIs of the most recent version of a kernel package, which is not yet released to customers, are retrieved from the kernel package and automatically compared to kABIs/kAPIs associated with one or more previously released versions of the kernel package and/or with those of the standard kernel package. The standard kernel package may be regarded as the provider-based kABI/kAPI standard of expectations or requirements for the unreleased kernel package to satisfy before it can be published or sold and thus, using the standard kernel package for comparison eliminates the need for comparison with previous kernel package versions.

Any discrepancies revealed by the comparison may mean the unreleased version kernel package failed the minimum kABI/kAPI requirements for its release. The unintended discrepancies are corrected by a provider-based kernel developer before the kernel package is published or provided to customers, which prevents the customers from encountering kernel-based errors; while, the intended discrepancies are maintained. This way, the unreleased kernel package (e.g., Linux kernel package) is successfully released as part of a software package (e.g., Red Hat Package Manger ("RPM package manger")—a recursive acronym) and is capable of being in compliance with certain third-party kernel modules (e.g., kernel ISVs) that may be needed to support certain hardware/software components (e.g., drivers) designed to work with a particular version of a kernel (e.g., Linux kernel ver. 2.0).

As will be discussed throughout this document, a provider refers to a company or organization responsible for developing and providing kernel packages, while customers refers to third-party companies or organizations that receive and run the kernel packages on their computing systems. A kABI (e.g., Linux kABI) refers to a library interface provided by the kernel and its accompanying modules. A kAPI (e.g., Linux kABI) refers to an interface providing a uniform method for certain hardware and low-level software to facilitate access to system resources and services.

FIG. 1 illustrates a host machine 100 employing a kernel ABI/API discrepancy management mechanism 110 according to one embodiment of the invention. Host machine 100 includes a base hardware platform 102 that comprises a computing platform, which may be capable, for example, of working with a standard operating system 108. Operating system 108 serves as an interface between any hardware or physical resources of the host machine 100 and a user (e.g., software developer, computer programmer, system administrator, etc.). In some embodiments, base hardware platform 102 may include a processor 104, memory devices 106, network devices, drivers, and so on. Host machine 100 may include a server computing system or a client computing system. Further, terms like "machine", "device", "computer", and "computing system" are used interchangeably and synonymously throughout this document.

In one embodiment, the host machine 100 employs the kernel ABI/API discrepancy management mechanism 110 ("kernel ABI/API mechanism") to manage kABIs/kAPIs-based discrepancies found between two or more kernel packages. A kernel package may be part of a software package stored on a storage medium 118 of the host machine 100 or of a remote machine that is in communication with the host machine 100. In one embodiment, the kernel ABI/API mechanism 110 finds and retrieves an unreleased version of a software package having an unreleased version of a kernel package and, in some cases, one or more released versions of software packages and/or the standard kernel package.

Once the software package is obtained, the kernel ABI/API mechanism 110 reads its unreleased version kernel package and retrieves its kernel ABI/API-related information. In one embodiment, a development file (e.g., module.symvers) of the unreleased version kernel package may be read to retrieve such information. A development file defines and includes development details relating to the development of a kernel package and its ABIs/APIs. For example, the development details may include specific kernel ABI/API-related information, such as names and/or identifying hash numbers of each kernel ABI/API, as well as other development information, such as name(s) of kernel developer(s) who developed or programmed the kernel package, names of one or more organizational departments or groups (to which one or more kernel developers may belong) that might be the source of or responsible for or somehow related to the development of the kernel package, kernel package development start and end dates, and the like. The development details may also include relevant customer information, such as customer name, a list of customer requirements relating to the kernel package to which the development file is associated, details of support criteria relating to one or more customers, etc. Using the kernel ABI/API information obtained from the development file of the unreleased version kernel package, a dataset that can be used for comparison is generated. In one embodiment, the kernel ABI/API mechanism 110 then compares the newly-generated dataset of the unreleased version kernel package with a dataset of a released version kernel package or that of the standard version kernel package. In another words, in one embodiment, the kABIs/kAPIs (contained in the newly-generated dataset) associated with the unreleased version kernel package are compared with kABIs/kAPIs (contained in an existing dataset) of a released version of the kernel package. In another embodiment, the released version kABIs/kAPIs are compared with the standard version kABIs/kAPIs (contained in an existing dataset) of the standard version kernel package.

If the dataset comparison reveals discrepancies, a human-readable discrepancy report listing the revealed discrepancies along with other relevant information is generated. The discrepancy report may be used by a provider-based user, such as a kernel developer, to study the discrepancies provided in the report and then, use the information to cleanse the unreleased version kernel package of such discrepancies. Any unintentional discrepancies (e.g., those made in error) are fixed or removed, while intentional discrepancies (e.g., ones due to an update or upgrade to a kernel-supported function (e.g., printk( ), deletek( ), etc.)) are maintained, but potential customers are notified of such discrepancies so they may anticipate and accommodate the changes.

In one embodiment, certain development information (e.g., name(s) of the kernel developer(s) who developed the unreleased version kernel package, kernel package development start and end dates, etc.) regarding the unreleased version kernel package may also be obtained from the development file, such as module.symvers, of the unreleased version kernel package. This development information can be used to further enhance efficiency and stability of the discrepancy correction process, such as, using the development information, to track down the original kernel developer of the unreleased version kernel package so they can be assigned the task of correcting the discrepancies, etc.

In some cases, third-party kernel packages may be employed by a customer. These third-party kernel packages are, at least partly, developed by an organization other than the provider that produces the base kernel package associated with the base operating system 108. For example, a third-party kernel package may be designed to work with the base kernel package while, for example, facilitating communication with or delivery of certain third-party kernel-based hardware and/or software components to provide additional kernel-based functions.

Figure 2:
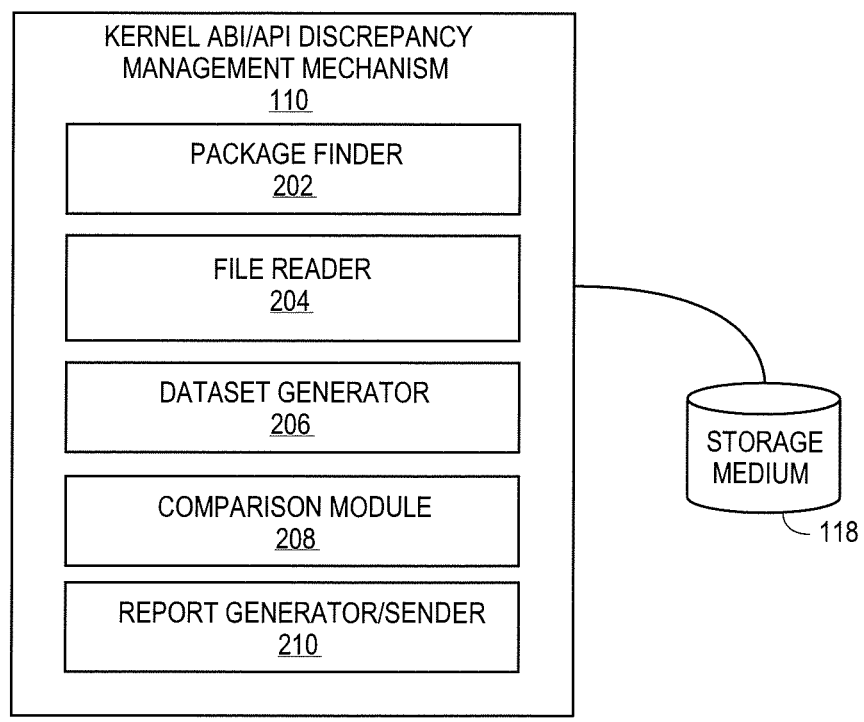
FIG. 2 illustrates a kernel application binary interface/application programming interface discrepancy management mechanism according to one embodiment of the invention.

FIG. 2 illustrates a kernel ABI/API discrepancy management mechanism 110 according to one embodiment of the invention. In one embodiment, the kernel ABI/API mechanism 110 includes a package finder 202 to find a software package which contains an unreleased version kernel package for which the discrepancy report is to be generated. It is contemplated that the software package may be stored in a storage medium 118 of the host machine or another machine in communication with the host machine. The package finder 202 obtains the software package from the storage medium 118 and provides it to a file reader 204 of the kernel ABI/API mechanism 110.

In one embodiment, the file reader 204 reads a development file (e.g., module.symvers) of the unreleased version kernel package to detect and obtain its kABIs/kAPIs and relevant information from the development file. For example, the file reader 204 accesses the development file and finds, for example, four columns of kABI-related information, such as the kABI hash number (e.g., 0xe10033c9, 0xd678a0f2, etc.) representing a kABI, kABI name (e.g., genericille_splice_write, iscsi_host_add, etc.), a hint (or more than a hint) about the source of kernel package development, such as an identification of the software development team (e.g., vmlinux, drivers/scsi/libiscsi, etc.), and other miscellaneous details, such as information identifying potential customers or beneficiaries of the kernel package, export license details (e.g., EXPORT_SYMBOL, EXPORT_SYMBOL_GPL, etc.), etc. It is contemplated that the file reader 204 can work with any number of development files and their formats that may be used with kernel packages.

Once the kABI/kAPI-related information is retrieved from the development file, the information is then provided to a dataset generator 206 to transform the information into a dataset. For example, the dataset may be used in organizing and formatting the information so that it is compatible and comparable with other existing datasets, such as a released version dataset of a previously released version kernel package or a standard dataset of the standard kernel package.

This newly-generated dataset is then forwarded on to a comparison module 208 for comparison purposes. In one embodiment, the comparison module 208 compares the newly-generated unreleased version dataset of the unreleased version kernel package (e.g., kernel package version 4.0) to an existing released version dataset of a released version kernel package (e.g., the last version that was released or published, such as kernel package version 3.0). In some embodiments, the unreleased version dataset may be compared with multiple released version datasets of multiple released version kernel packages (e.g., kernel packages 1.0 and 3.0). In another embodiment, the unreleased version dataset is compared to an existing standard dataset of the standard kernel package.

This comparison of datasets is used to determine whether the unreleased version kernel package is complete and ready for release. This determination, however, is based on whether any unintended discrepancies between the aforementioned datasets are detected. As discussed with reference to FIG. 1, any unintended discrepancies (e.g., those based on errors or mistaken changes) are to be removed from the unreleased version kernel package, while the intended discrepancies (e.g., those based on intentional updates or upgrades to kernel-based or other functions) are preserved. With regard to the intended discrepancies, the potential customers are notified of such discrepancies so they may prepare (e.g., their hardware, software, etc.) to accommodate the new changes being proposed in the kernel package. Moreover, a user (e.g., provider-based software developer) may use a discrepancy report, generated by a report generator/sender 210, as a reference and source of information to study and correct the unintended discrepancies. For example, the discrepancy report may list the detected (intended and unintended) discrepancies and their relevant information so that the user may have enough information to remove unintended discrepancies and/or maintain intended discrepancies. The discrepancy report may be provided to the user in any number of readable formats (e.g., Portable Document Format (PDF), Open Document Format (ODF), text, graphs, charts, etc.).

Figure 3:
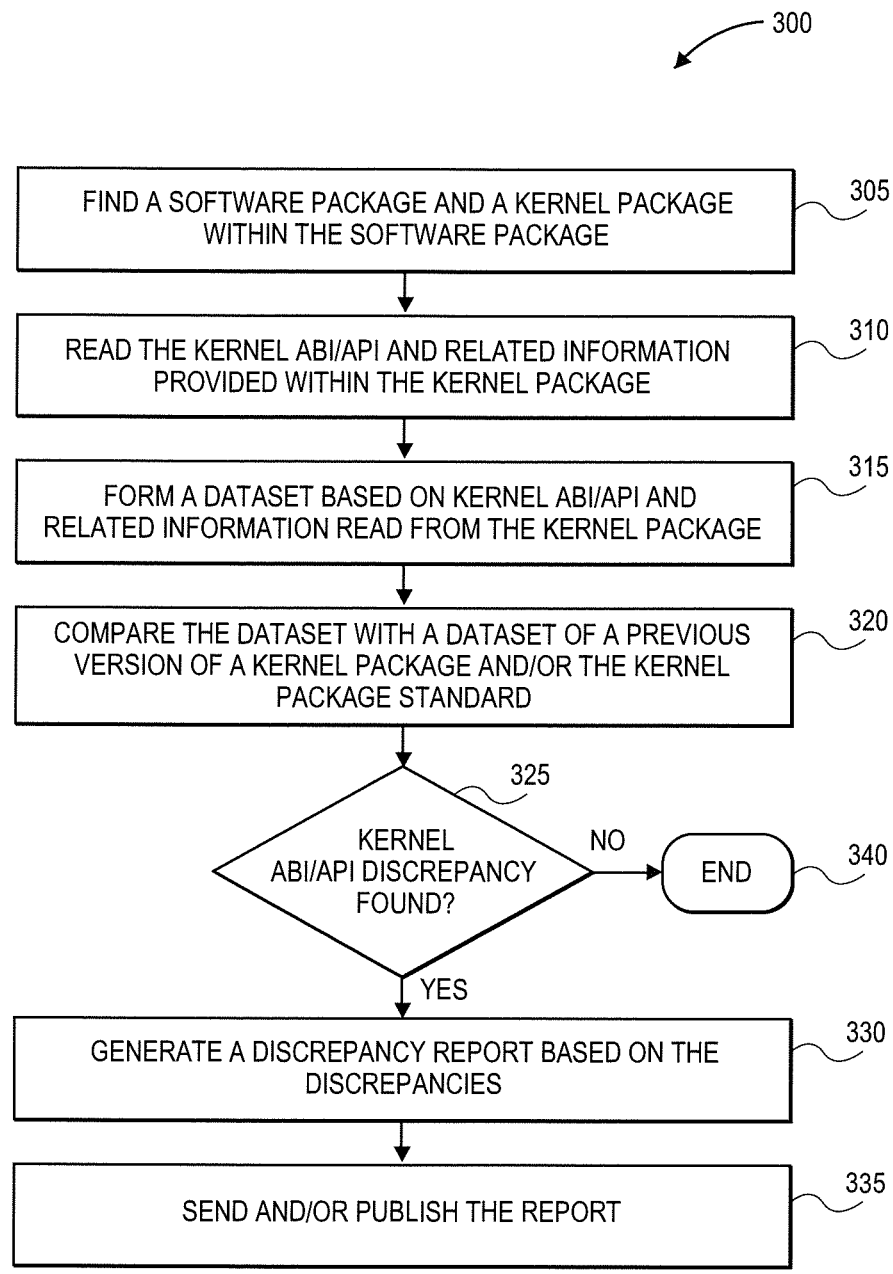
FIG. 3 illustrates a method for performing kernel application binary interface/application programming interface discrepancy management according to one embodiment of the invention.

FIG. 3 illustrates a method for managing kernel ABI/API discrepancies according to one embodiment of the invention. Method 300 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 300 is performed by kernel ABI/API discrepancy management mechanism of FIG. 1.

Method 300 starts at block 305 with finding a software package that includes a kernel package (e.g., unreleased version kernel package) for which this discrepancy process is performed. At block 310, in one embodiment, a development file within the kernel package is read to retrieve the kernel package's kABIs/kAPIs and their relevant information (e.g., kABI/kAPI name, hash number, source and other development information (e.g., group, department, individual, start and end dates of development, etc.), customer information, etc.). At block 315, using the retrieved kABIs/kAPIs and their relevant information, a dataset representing the unreleased version kernel package is formed.

At block 320, in one embodiment, the newly-formed unreleased version dataset is compared with an existing released version dataset representing a previously released version of the kernel package. In another embodiment, the newly-formed unreleased version dataset is compared with multiple existing released version datasets representing multiple released versions of the kernel package. In yet another embodiment, the newly-formed unreleased version dataset is compared with an existing standard dataset representing the standard kernel package. At decision block 325, a determination is made as to whether any kernel ABI/API-based discrepancies were found when the newly-formed unreleased version dataset was compared with the existing released version datasets and/or standard datasets. If no discrepancies were found, the process ends at block 340.

If any number of discrepancies were found, a discrepancy report is generated to illustrate these discrepancies and other relevant information retrieved from the development file and based on the dataset comparisons at block 330. The discrepancy report is then published or provided to users in a user-friendly format (e.g., PDF, text, etc.) at block 335.

Figure 4:
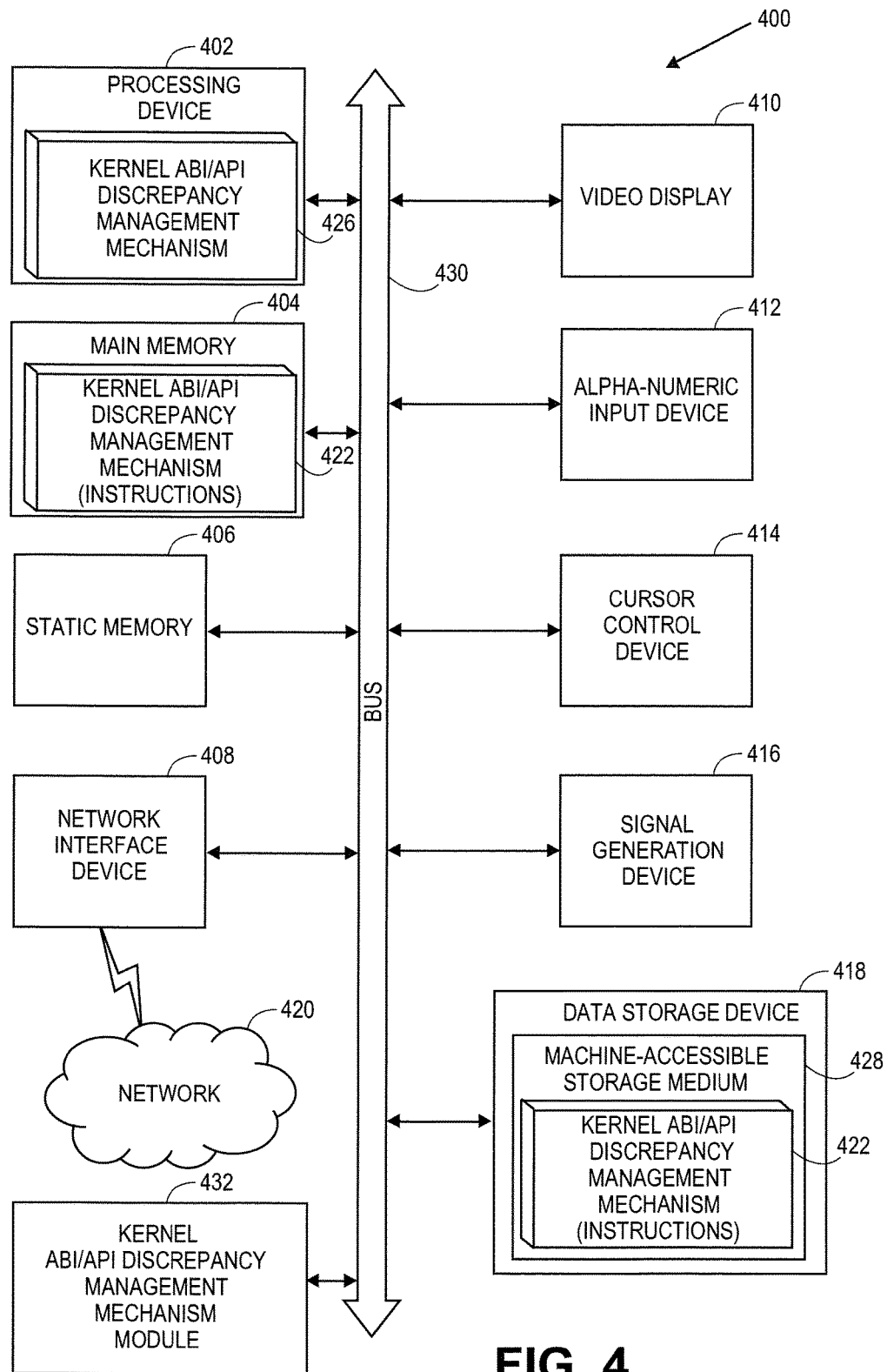
FIG. 4 illustrates a computing system according to one embodiment of the invention.

FIG. 4 illustrates a computing system 400 employing a kernel ABI/API discrepancy management mechanism according to one embodiment of the invention. Within the computing system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 400 includes a processing device 402, a main memory 404 (e.g., read-only memory (ROM), flash memory, RAM, dynamic RAM (DRAM) such as synchronous DRAM (SDRAM), DRAM (RDRAM), etc.), a static memory 406 (e.g., flash memory, static random access memory (SRAM), etc.), and a secondary memory 418 (e.g., a data storage device in the form of a drive unit, which may include fixed or removable machine-accessible or computer-readable storage medium), which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the processing logic 426 for performing the operations and methods discussed herein.

The computing system 400 may further include a network interface device 408. The computing system 400 also may include a video display unit 410 (e.g., a liquid crystal display (LCD) or a cathode ray tube (CRT)) connected to the computing system through a graphics port and graphics chipset, an alphanumeric input device 412 (e.g., a keyboard), a cursor control device 414 (e.g., a mouse), and a signal generation device 416 (e.g., a speaker).

The data storage device 418 may include a machine-accessible storage medium (or a computer-readable storage medium) 428 on which is stored one or more sets of instructions 422 (e.g., kernel ABI/API discrepancy management mechanism) embodying any one or more of the methodologies or functions described herein. The kernel ABI/API discrepancy management mechanism may also reside, completely or at least partially, within the main memory 404 (e.g., kernel ABI/API discrepancy management mechanism (instructions) 422) and/or within the processing device 402 (e.g., kernel ABI/API discrepancy management mechanism (processing logic) 426) during execution thereof by the computing system 400, the main memory 404 and the processing device 402 also constituting machine-readable storage media. Further, for example, the kernel ABI/API discrepancy management mechanism instructions 422 may be transmitted or received over a network 420 via the network interface device 408.

The machine-readable storage medium 428 may also be used to store the kernel ABI/API discrepancy management mechanism (instructions) 422 persistently. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Kernel ABI/API discrepancy management mechanism modules 432, components and other features described herein (for example in relation to FIG. 1) can be implemented as discrete hardware components or integrated in the functionality of hardware components such as ASICS, FPGAs, DSPs or similar devices. In addition, the modules 432 can be implemented as firmware or functional circuitry within hardware devices. Further, the modules 432 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "finding", "extracting", "detecting", "reading", "retrieving", "forming", comparing", "generating", "sending", "publishing", "emailing", "saving", "storing", "obtaining", "communicating", "accessing", "providing", "facilitating", "maintaining", "preserving", "notifying", "fixing", "correcting", "removing" or the like, refer to the action and processes of a computing system, or similar electronic computing device, that manipulates and transforms data represented as physical (electronic) quantities within the computing system's registers and memories into other data similarly represented as physical quantities within the computing system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computing system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computing system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
retrieving a first kernel interface information from a first file within a kernel package, wherein the first kernel interface information relates to kernel interfaces associated with the kernel package, wherein the kernel interfaces comprise a first kernel application binary interface (kABI) and a second kABI, wherein the first file is a development file of the kernel package, wherein the development file comprises a hint about a source of the kernel package, the hint including an identification of a kernel developer of the kernel package;
forming a first dataset comprising the first kernel interface information relating to a first version of the kernel package, the first dataset being formed in view of a format of a second dataset relating to a second version of the kernel package, wherein the forming the first dataset comprises:
reading the development file to obtain a hash number of the first kABI, a hash number of the second kABI, and the hint; and
transforming the hash number of the first kABI, the hash number of the second kABI, and the hint into the first dataset into the format such that the first dataset is compatible and comparable with the second dataset and a third dataset relating to a third version of the kernel package;
comparing the first dataset with the second dataset;
comparing the first dataset with the third dataset;
detecting, by a processing device, kernel discrepancies based on the comparison of the first dataset with the second dataset and based on the comparison of the first dataset with the third dataset, wherein the kernel discrepancies comprise at least:
a discrepancy between a hash number associated with the first kABI of the first version of the kernel package and a hash number associated with a first kABI of the second version of the kernel package;
a discrepancy between the hash number associated with the first kABI of the first version and a hash number associated with a first kABI associated with a third version;
an unintended kernel discrepancy between the first kABI of the first version and the first kABI of the second version or the first kABI of the third version, wherein the unintended kernel discrepancy is caused by an error or a mistaken change in the first kABI of the first version; and
a first intended kernel discrepancy between the second kABI of the first version and a second kABI of the second version, wherein the first intended kernel discrepancy is caused by an update or an upgrade to a function associated with the second kABI of the first version; and
a second intended kernel discrepancy between the second kABI of the first version and a second kABI of the third version, wherein the second intended kernel discrepancy is caused by the update or the upgrade to the function associated with the second kABI of the first version;
generating a human-readable discrepancy report in response to detection of the kernel discrepancies, wherein the generating the human-readable discrepancy report further comprises:
generating a list of the kernel discrepancies to be illustrated in the human-readable discrepancy report in view of the detecting;
populating the human-readable discrepancy report with the hint corresponding to the unintended kernel discrepancy to assign a task to the kernel developer to correct the unintended kernel discrepancy; and
populating the human-readable discrepancy report with additional information from the first kernel interface information that identifies the update or the upgrade to the function associated with the second kABI of the first version, the additional information to be used to remove the unintended kernel discrepancy and maintain the first intended kernel discrepancy and the second intended kernel discrepancy;
determining whether the first version of the kernel package is ready to be released when a number of unintended kernel discrepancies, identified in the human-readable discrepancy report, satisfies a minimum kABI requirement for release; and
sending the first version of the kernel package to a computing system when the number of unintended kernel discrepancies identified in the human-readable discrepancy report satisfies the minimum kABI requirement for release, the computing system to execute the first version of the kernel package.

2. The method of claim 1, wherein the kernel interfaces further comprise application programming interfaces (APIs).

3. The method of claim 1, wherein the first version comprises a newly unreleased version of the kernel package, and wherein the second version comprises a previously released version and the third version comprises a standard version of the kernel package.

4. The method of claim 1, further comprising correcting, at a provider, the kernel discrepancies that are unintended prior to the sending the first version of the kernel package to the computing system.

5. The method of claim 1, further comprising maintaining intended kernel discrepancies between the first and second versions, and sending notifications of the intended kernel discrepancies.

6. The method of claim 1, wherein the development file further comprises one or more of kernel interface names, kernel interface hash numbers, kernel package developer name, kernel package developer group name, customer information, and licensing information.

7. The method of claim 1, wherein the development file further comprises an identification of the update or upgrade to the function associated with the second kABI of the first version.

8. A system comprising:
a memory; and
a processing device, operatively coupled with the memory, to:
retrieve a first kernel interface information from a first file within a kernel package, wherein the first kernel interface information relates to kernel interfaces associated with the kernel package, wherein the kernel interfaces comprise a first kernel application binary interface (kABI) and a second kABI, wherein the first file is a development file of the kernel package, wherein the development file comprises a hint about a source of the kernel package, the hint including an identification of a kernel developer of the kernel package;

form a first dataset comprising the first kernel interface information relating to a first version of the kernel package, the first dataset being formed in view of a format of a second dataset relating to a second version of the kernel package, wherein the first dataset is formed by:

reading the development file to obtain a hash number of the first kABI, a hash number of the second kABI, and the hint; and transforming the hash number of the first kABI, the hash number of the second kABI, and the hint into the first dataset into the format such that the first dataset is compatible and comparable with the second dataset and a third dataset relating to a third version of the kernel package;

compare the first dataset with the second dataset;

compare the first dataset with the third dataset;

detect kernel discrepancies based on the comparison of the first dataset with the second dataset and based on the comparison of the first dataset with the third dataset, wherein the kernel discrepancies comprise at least:

a discrepancy between a hash number associated with the first kABI of the first version of the kernel package and a hash number associated with a first kABI of the second version of the kernel package;

an unintended kernel discrepancy between the first kABI of the first version and the first kABI of the second version, wherein the unintended kernel discrepancy is caused by an error or a mistaken change in the first kABI; and an intended kernel discrepancy between the second kABI of the first version and a second kABI of the second version, wherein the intended kernel discrepancy is caused by an update or an upgrade to a function associated with the second kABI of the first version;

generate a human-readable discrepancy report in response to detection of the kernel discrepancies, wherein the human-readable discrepancy report further comprises:

a list of the kernel discrepancies to be illustrated in the human-readable discrepancy report in view of the detecting;

the hint corresponding to the unintended kernel discrepancy to assign a task to the kernel developer to correct the unintended kernel discrepancy; and additional information from the first kernel interface information that identifies the update or the upgrade to the function associated with the second kABI of the first version, the additional information to be used to remove the unintended kernel discrepancy and maintain the intended kernel discrepancy;

determine whether the first version of the kernel package is ready to be released when a number of unintended kernel discrepancies, identified in the human-readable discrepancy report, satisfies a minimum kABI requirement for release; and send the first version of the kernel package to a computing system when the number of unintended kernel discrepancies identified in the human-readable discrepancy report satisfies the minimum kABI requirement for release, the computing system to execute the first version of the kernel package.

9. The system of claim 8, wherein the kernel interfaces further comprise application programming interfaces (APIs).

10. The system of claim 8, wherein the first version comprises a newly unreleased version of the kernel package, and wherein the second version comprises a previously released version or a standard version of the kernel package.

11. The system of claim 8, wherein the processing device is further to correct, at a provider, the kernel discrepancies that are unintended prior to sending the first version of the kernel package to the computing system.

12. The system of claim 8, wherein the processing device is further to maintain intended kernel discrepancies between the first and second versions, and sending notifications of the intended kernel discrepancies.

13. The system of claim 8, wherein the development file further comprises one or more of kernel interface names, kernel interface hash numbers, kernel package developer name, kernel package developer group name, customer information, and licensing information.

14. The system of claim 8, wherein the kernel discrepancies further comprise:

a discrepancy between the hash number associated with the first kABI of the first version and a hash number associated with a first kABI associated with the third version; and a second intended kernel discrepancy between the second kABI of the first version and a second kABI of the third version, wherein the second intended kernel discrepancy is caused by the update or the upgrade to the function associated with the second kABI of the first version, and wherein the additional information is used to remove the unintended kernel discrepancy and maintain the intended kernel discrepancy and the second intended kernel discrepancy.

15. The system of claim 14, wherein the kernel discrepancies further comprise a second unintended kernel discrepancy between the first kABI of the first version and the first kABI of the third version, wherein the unintended kernel discrepancy is caused by an error or a mistaken change in the first kABI of the first version.

16. The system of claim 14, wherein the kernel discrepancies further comprise a second unintended kernel discrepancy between the second kABI of the first version and the second kABI of the third version, wherein the unintended kernel discrepancy is caused by an error or a mistaken change in the second kABI of the first version.

17. A non-transitory machine-readable medium comprising instructions that, when executed by a processing device, cause the processing device to:

retrieve a first kernel interface information from a first file within a kernel package, wherein the first kernel interface information relates to kernel interfaces associated with the kernel package, wherein the kernel interfaces comprise a first kernel application binary interface (kABI) and a second kABI;

form a first dataset comprising the first kernel interface information relating to a first version of the kernel package, the first dataset being formed in view of a format of a second dataset relating to a second version of the kernel package, wherein the first dataset is formed by:
  reading the first file to obtain a hash number of the first kABI and a hash number of the second kABI; and
  transforming the hash number of the first kABI and the hash number of the second kABI into the first dataset into the format such that the first dataset is compatible and comparable with the second dataset and a third dataset relating to a third version of the kernel package;
compare the first dataset with the second dataset;
compare the first dataset with the third dataset;
detect kernel discrepancies based on the comparison of the first dataset with the second dataset and based on the comparison of the first dataset with the third dataset, wherein the kernel discrepancies comprise at least:
  a discrepancy between a hash number associated with the first kABI of the first version of the kernel package and a hash number associated with a first kABI of the second version of the kernel package;
  a discrepancy between the hash number associated with the first kABI of the first version and a hash number associated with a first kABI associated with a third version;
  an unintended kernel discrepancy between the first kABI of the first version and the first kABI of the second version or the first kABI of the third version, wherein the unintended kernel discrepancy is caused by an error or a mistaken change in the first kABI;
  a first intended kernel discrepancy between the second kABI of the first version and a second kABI of the second version, wherein the first intended kernel discrepancy is caused by an update or an upgrade to a function associated with the second kABI of the first version; and
  a second intended kernel discrepancy between the second kABI of the first version and a second kABI of the third version, wherein the second intended kernel discrepancy is caused by the update or the upgrade to the function associated with the second kABI of the first version;
generate a human-readable discrepancy report in response to detection of the kernel discrepancies, wherein the human-readable discrepancy report further comprises:
  a list of the kernel discrepancies to be illustrated in the human-readable discrepancy report in view of the detecting; and
  additional information from the first kernel interface information that identifies the update or the upgrade to the function associated with the second kABI of the first version, the additional information to be used to remove the unintended kernel discrepancy and maintain the first intended kernel discrepancy and the second intended kernel discrepancy;
determine whether the first version of the kernel package is ready to be released when a number of unintended kernel discrepancies, identified in the human-readable discrepancy report, satisfies a minimum kABI requirement for release; and
send the first version of the kernel package to a computing system when the number of unintended kernel discrepancies identified in the human-readable discrepancy report satisfies the minimum kABI requirement for release, the computing system to execute the first version of the kernel package.

18. The non-transitory machine-readable medium of claim 17, wherein the kernel interfaces further comprise application programming interfaces (APIs).

19. The non-transitory machine-readable medium of claim 17, wherein the first version comprises a newly unreleased version of the kernel package, and wherein the second version comprises a previously released version and the third version comprises a standard version of the kernel package.

20. The non-transitory machine-readable medium of claim 17, wherein the processing device is further to correct, at a provider, the kernel discrepancies that are unintended prior to sending the first version of the kernel package to the computing system.

21. The non-transitory machine-readable medium of claim 17, wherein the first file is a development file of the kernel package, wherein the development file comprises a hint about a source of the kernel package, the hint including an identification of a kernel developer of the kernel package, wherein the human-readable discrepancy report further comprises the hint corresponding to the unintended kernel discrepancy to assign a task to the kernel developer to correct the unintended kernel discrepancy.

\* \* \* \* \*